United States Patent Office 3,497,344
Patented Feb. 24, 1970

3,497,344
HERBICIDAL COMPOSITIONS AND METHODS UTILIZING URAMIDOBENZOATE COMPOUNDS
Cecil W. Le Fevre, Anaheim, Don L. Hunter, Long Beach, Kiyoshi Kitasaki, Garden Grove, and Robert F. Crawford, La Mirada, Calif., assignors to United States Borax & Chemical Corporation, Los Angeles, Calif., a corporation of Nevada
No Drawing. Filed Nov. 15, 1966, Ser. No. 594,367
Int. Cl. A01m 9/22; C07d 29/26, 41/04
U.S. Cl. 71—88
18 Claims

ABSTRACT OF THE DISCLOSURE

This invention comprises herbicidal compositions containing as an active ingredient the esters of 2-(ω-alkyleneiminouramido)benzoic acid in which the alkylene group has 4 to 7 carbon atoms and use of the compositions for controlling weed growth. Selective control of weeds in desirable crops, such as peanuts, safflower, carrots and watermelons, can be obtained.

---

This invention relates to novel uramidobenzoate compounds and herbicidal compositions and methods utilizing said uramidobenzoates.

According to the present invention there are provided herbicidal compositions and methods utilizing esters of 2-(ω-alkyleneiminouramido)benzoic acid in which the alkylene group has from about 5 to about 7 carbon atoms. Particularly preferred compounds are those of the formula

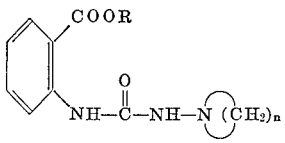

wherein R is selected from the group consisting of alkyl, alkenyl, alkynyl, and aryl groups, and $n$ is an integer of from about 4 to about 7, inclusive.

Thus, the ester group of the compounds of this invention can be an aliphatic group, such as alkyl, alkenyl, and alkylnyl, which can also be substituted with halogen substituents. The preferred aliphatic groups represented by R are the lower alkyl, alkenyl and alkynyl groups such as methyl, ethyl n-propyl, isopropyl, n-butyl, sec.-butyl, n-hexyl, 2-chloroethyl, trichloroethyl, trifluoroethyl, allyl, 2 - butenyl, 2 - chloro-2-propenyl, 4 - chloro-2-butynyl, propynyl, 2-bromoethyl, and the like. R can also represent an aryl group, especially the monocyclic aryl groups such as phenyl and nuclear substituted phenyls such as the halophenyls and alkylphenyls.

The compounds of the present invention are generally crystalline solids which are soluble in the usual organic solvents such as alcohols, ether, benzene, xylene, acetone and dioxane. They are readily prepared from the esters of anthranilic acid and the corresponding N-aminoalkyleneimine. According to this method of preparation, the anthranilate is converted to the corresponding isocyanate by reaction with phosgene and then reacted with the N-aminoalkyleneimine to give the desired compound. The preparation can be illustrated by the following equation in which R and $n$ have the significance previously assigned.

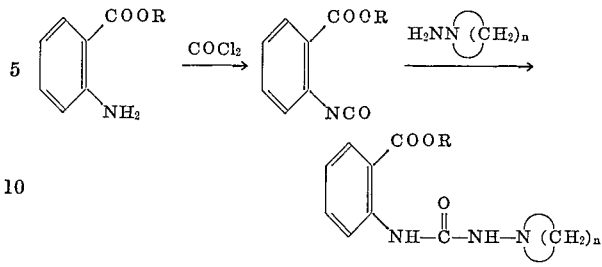

The anthranilate, preferably as the hydrochloride, is reacted with phosgene to give the isocyanate as illustrated above. This reaction takes place in a relatively high boiling solvent, such as toluene, xylene, isooctane, or the like. The resultant isocyanate is isolated by distillation and then reacted with the N-aminoalkyleneimine in the presence of an inert solvent, such as the hydrocarbons, to give the desired uramidobenzoate. The uramidobenzoate is isolated and purified by conventional procedures such as by recrystallization from a suitable solvent such as, for example pentane, hexane or benzene.

Some of the higher esters, such as the phenyl ester, can also be prepared by transesterification of other esters such as the methyl ester using well-known transesterification procedures.

The following examples are presented to illustrate the preparation of typical compounds of the invention but the invention is not to be considered restricted to the specific examples given.

EXAMPLE I

Methyl 2-isocyanatobenzoate

In a 5-liter, three-necked flask equipped with a gas inlet tube, stirrer and a reflux condenser connected to a water scrubber, was added 200 grams (1.32 moles) of methyl anthranilate dissolved in three liters of isooctane (commercial grade). Dry hydrogen chloride was passed into the isooctane solution of methyl anthranilate for 7 hours and a thick white precipitate was formed. The mixture was refluxed and phosgene was passed in at a rapid rate for 7 hours. The reaction mixture was then cooled and the insoluble precipitate was removed by filtration. The isooctane was removed at reduced pressure and the remaining residue was distilled to give 178.4 grams (76.2%) of product, B.P. 145°–146° C./16 mm.

Methyl 2-(ω-hexamethyleneiminouramido)benzoate

In a flask equipped with a magnetic stirring bar, dropping funnel and a reflux condenser was added 8.86 grams (0.05 mole) of methyl 2-isocyanatobenzoate dissolved in 50 ml. of benzene. To this stirring solution was added 5.71 grams (0.05 mole) of N-aminohexamethyleneimine dissolved in 50 ml. of benzene. The reaction was slightly exothermic and after addition was complete the reaction mixture was refluxed for 4.5 hours. The reaction mixture was then cooled and the solvent removed by distillation under vacuum. The remaining residue was dissolved in hot hexane and allowed to stand overnight. The crystals were filtered and dried to give 11.68 grams (80.2%), M.P. 103°–107° C. An analytical sample was obtained by recrystallization from hexane, M.P. 105°–107° C.

EXAMPLE II

Methyl 2-(ω-tetramethyleneiminouramido)benzoate

Methyl 2-isocyanatobenzoate was reacted with N-aminopyrrolidine in a similar manner to give methyl 2-(ω-tetramethyleneiminouramido)benzoate, M.P. 132°–133° C.

EXAMPLE III

Methyl 2-(ω-heptamethyleneiminouramido)benzoate

Methyl 2-isocyanatobenzoate was reacted with N-aminoheptomethyleneimine in a similar manner to give methyl 2-(ω-heptamethyleneiminouramido)benzoate, M.P. 101°–104° C.

EXAMPLE IV

Ethyl 2-(ω-pentamethyleneiminouramido)benzoate

Ethyl 2-isocyanatobenzoate was reacted with N-aminopiperidine in a similar manner to give ethyl 2-(ω-pentamethyleneiminouramido)benzoate, M.P. 166°–168° C.

EXAMPLE V n-Butyl 2-(ω-hexamethyleneiminouramido)benzoate n-Butyl 2-isocyanatobenzoate was reacted with N-aminohexamethyleneimine in a similar manner to give n-btuyl 2-(ω-hexamethyleneiminouramido)benzoate, M.P. 95°–97° C.

EXAMPLE VI 2-propynyl 2-(ω-hexamethyleneiminouramido)benzoate

A 200 ml. round-bottomed flask equipped with a magnetic stirrer and reflux condenser was charged with 5.72 grams (0.05 mole) of N-aminohexamethyleneamine, 10.06 grams (0.05 mole) of 2-propynyl 2-isocyanatobenzoate and 100 ml. of benzene. The reaction mixture was refluxed for three hours, and the benzene was then removed using a Rinco evaporator. The residue was dissolved in a refluxing mixture of 75 ml. of benzene and 75 ml. of hexane. On cooling, white crystalline solids precipitated which were filtered and dried to give 14.26 grams (90.5%); M.P. 129.5°–132° C. A recrystallized sample melted at 136°–138.5° C.

EXAMPLE VII

β,β,β-Trifluoroethyl 2-(ω-hexamethyleneiminouramido)benzoate

A 100 ml. round-bottomed flask equipped with a magnetic stirrer and reflux condenser was charged with 2.86 grams (0.025 mole) of N-aminohexamethyleneimine, 6.13 grams (0.025 mole) of β,β,β-trifluoroethyl 2-isocyanatobenzoate and 50 ml. of benzene. The mixture was refluxed for two hours, and the benzene was then removed on a Rinco evaporator. The residue was dissolved in 50 ml. of refluxing hexane, and on cooling the crystalline product was filtered and dried to give 8.08 grams (90.0%) of a white crystalline solid; M.P. 94°–98.5° C. A recrystallized sample melted at 95.5°–97.5° C.

EXAMPLE VIII 2-methyl-2-propenyl 2-(ω-hexamethyleneiminouramido)benzoate

A 100 ml. round-bottomed flask equipped with a magnetic stirrer and reflux condenser was charged with 2.85 grams (0.025 mole) of N-aminohexamethyleneimine, 5.34 grams (0.025 mole) of 2-methyl-2-propenyl 2-isocyanatobenzoate and 50 ml. of benzene. The mixture was refluxed for 3.25 hours, and the benzene was removed on a Rinco evaporator. The residue was dissolved in 50 ml. of refluxing hexane. On cooling, the product crystallized and was filtered and dried to give 7.35 grams (88.7%) of a white crystalline solid; M.P. 77.5°–80° C. A recrystallized sample melted at 78°–81° C.

EXAMPLE IX

Phenyl 2-(ω-hexamethyleneiminouramido)benzoate

A 250 ml. round-bottomed flask equipped with a magnetic stirrer and reflux condenser was charged with 2.86 grams (0.025 mole) of N-aminohexamethyleneimine, 5.98 grams (0.025 mole) of phenyl 2-isocyanatobenzoate and 100 ml. of diethyl ether. The resultant mixture was refluxed for 2.5 hours. The reaction mixture was cooled, and the solids were filtered and dried to give 7.57 grams (85.7%) of a white crystalline solid; M.P. 129°–130° C. A recrystallized sample melted at 127°–128° C.

The following are among the many other compounds of the present invention and can be prepared according to the above-described procedures.

ethyl 2-(ω-tetramethyleneiminouramido)benzoate, M.P. 132°–133° C.
n-propyl 2-(ω-tetramethyleneiminouramido)benzoate, M.P. 107°–109.5° C.
methyl 2-(ω-pentamethyleneiminouramido)benzoate, M.P. 153°–155° C.
n-propyl 2-(ω-pentamethyleneiminouramido)benzoate M.P. 125°–128° C.
n-butyl 2-(ω-pentamethyleneiminouramido)benzoate, M.P. 95°–97° C.
ethyl 2-(ω-hexamethyleneiminouramido)benzoate, M.P. 120°–122° C.
n-propyl 2-(ω-hexamethyleneiminouramido)benzoate, M.P. 104°–105° C.
isopropyl 2-(ω-hexamethyleneiminouramido)benzoate, M.P. 116°–120° C.
isobutyl 2-(ω-hexamethyleneiminouramido)benzoate, M.P. 114°– 115° C.
sec.-butyl 2-(ω-hexamethyleneiminouramido)benzoate, M.P. 110°–111° C.
n-hexyl 2-(ω-hexamethyleneiminouramido)benzoate, M.P. 84.5°–86.5° C.
2-butenyl 2-(ω-hexamethyleneiminouramido)benzoate, M.P. 104°–104.5° C.
2-chloro-2-propenyl 2-(ω-hexamethyleneiminouramido)benzoate, M.P. 101.5°–102° C.
2-chloroethyl 2-(ω-hexamethyleneiminouramido)benzoate, M.P. 126.5°–127° C.
2,4-dichlorophenyl 2-(ω-hexamethyleneiminouramido)benzoate, M.P. 125.5°–126° C.
β,β,β-trichloroethyl 2-(ω-hexamethyleneiminouramido)benzoate, M.P. 143.5°–145° C.
ally 2-(ω-pentamethyleneiminouramido)benzoate, M.P. 104.5°–106° C.
allyl 2-(ω-hexamethyleneiminouramido)benzoate, M.P. 65°–70° C.

The uramidobenzoates of this invention are effective herbicidal compounds useful for controlling weed growth. "Weeds" as used herein is intended to include any plant growth which is undesirable. The compounds are useful as a pre-emergence or post-emergence treatment; that is, they can be used to kill or suppress the growth of plants or to kill or prevent the emergence of seedlings of unwanted plants. Thus, the compounds can be used to control the growth of weeds by applying a phytotoxic amount to the locus of the weeds, that is, the foliage of the growing plants or soil in which the weeds are growing or will grow.

Generally an application rate of from about 0.25 to about 25 pounds of one or more of the active compounds per acre is an effective phytotoxic amount, although greater or lesser amounts can be used if desired. The presently preferred application rate is in the range of from about 1 to about 15 pounds per acre. At lower application rates the compounds have selective activity and are especially useful for controlling weed growth in desirable crops such as peanuts, safflower, carrots and watermelons.

The following examples illustrate the herbicidal activity of representative compounds of this invention.

EXAMPLE X

Ethyl 2-(ω-hexamethyleneiminouramido)benzoate in a methanol-dioxane solution was applied as a post-emergence treatment at an application rate of 4 pounds per acre to mustard, velvetleaf, ragweed, lamb's quarter, pigweed, foxtail, ryegrass, crabgrass, wild oats and peanuts. Forty-three days after treatment, a complete kill of all plants was recorded except for the peanuts which showed no injury.

EXAMPLE XI 2-propynyl 2-(ω-hexamethyleneiminouramido)benzoate was applied in a methanol-dioxane solution as a pre-emergence treatment at an application rate of 4 pounds per acre to mustard, bindweed, ragweed, velvetleaf, lamb's quarter, watergrass, wild oats, Johnson grass and crabgrass. Thirty-one days after treatment a complete kill or nonemergence of all plants was recorded.

EXAMPLE XII n-Butyl 2 - (ω-pentamethylenediminouramido)benzoate in a methanol-dioxane solution was applied as a post-emergence treatment at an application rate of 2.5 pounds per acre to velvetleaf, lamb's quarter, watergrass, wild oats, Johnson grass, crabgrass, and peanuts. Thirty-four days after treatment a substantially complete kill of all plants was recorded except for the peanuts which showed no injury.

EXAMPLE XIII n-Propyl 2-(ω-tetramethyleneiminouramido)benzoate in a methanol-dioxane solution was applied as a pre-emergence treatment at an application rate of 4 pounds per acre to mustard, bindweed, ragweed, lamb's quarter, foxtail, watergrass, crabgrass, peanuts and sorghum. Thirty-four days after treatment a complete kill or nonemergence of all plants was recorded except for the peanuts and sorghum which showed no injury.

EXAMPLE XIV

Methyl 2 - (ω-pentamethylenediminouramido)benzoate in a methanol-dioxane solution was applied as a pre-emergence treatment at an application rate of 2.5 pounds per acre to mustard, watergrass, ragweed, lamb's quarter, pigweed, velvetleaf, foxtail, ryegrass, crabgrass, Johnson grass, wild oats and peanuts. Twenty-nine days after treatment a complete kill of all plants was recorded except for the peanuts which showed no injury.

EXAMPLE XV n-Propyl 2 - (ω-pentamethyleneiminouramido)benzoate in a methanol-dioxane solution was applied as a pre-emergence treatment at an application rate of 4 pounds per acre to foxtail, ryegrass, watergrass, wild coats, Johnson grass, crabgrass, and peanuts. Thirty-three days after treatment a complete kill or nonemergence of al plants was recorded except for the peanuts which showed no injury.

EXAMPLE XVI

Allyl 2-(ω-hexamethyleneiminouramido)benzoate in a methanol-dioxane solution was applied as a pre-emergence treatment at an application rate of 7.5 pounds per acre to corn, millet, ryegrass, oats, peas, mustard, cucumbers and snap beans. Twenty-nine days after treatment a complete kill or nonemergence of all plants was recorded.

EXAMPLE XVII

Isobutyl 2 - (ω-hexamethyleneiminouramido)benzoate in a methanol-dioxane solution was applied as a post-emergence treatment at an application rate of 4 pounds per acre to watergrass, wild oats, Johnson grass and crabgrass. Thirty days after treatment a complete kill of all plants was recorded.

EXAMPLE XVIII

β,β,β-Trifluoroethyl 2 - (ω-hexamethyleneiminouramido)-benzoate in a methanol-dioxane solution was applied as a pre-emergence treatment at an application rate of 4 pounds per acre to pigweed, downey brome, watergrass, wild oats, Johnson grass, mustard, ragweed, velvetleaf and lamb's quarter. Thirty-three days after treatment a complete kill or nonemergence of all plants was recorded.

EXAMPLE XIX

2 - chloro-2-propenyl 2-(ω-hexamethyleneiminouramido)-benzoate in a methanol-dioxane solution was applied as a post-emergence treatment at an application rate of 2.5 pounds per acre to crabgrass, wild oats, downey brome, velvetleaf, ragweed, and mustard. Thirty days after treatment a complete kill of all plants was recorded.

EXAMPLE XX

2 - chloroethyl 2-(ω-hexamethyleneiminouramido)benzoate in a methanol-dioxane solution was applied as a pre-emergence treatment at an application rate of 0.75 pound per acre to mustard, velvetleaf, lamb's quarter, watergrass, and crabgrass. Thirty-three days after treatment a complete kill or nonemergence of all plants was recorded.

EXAMPLE XXI

Phenyl 2 - (ω-hexamethyleneiminouramido)benzoate in a methanol-dioxane solution was applied as a pre-emergence treatment at an application rate of 0.75 pound per acre to safflower, crabgrass, Johnson grass, lamb's quarter, velvetleaf, and mustard. Thirty-three days after treatment a complete kill or nonemergence of all plants was recorded except for safflower which showed no injury.

EXAMPLE XXII 2,4-dichlorophenyl 2-(ω-hexamethyleneiminouramido)-benzoate in a methanol-dioxane solution was applied as a pre-emergence treatment at an application rate of 2.5 pounds per acre to safflower, crabgrass, wild oats, watergrass, lamb's quarter, velvetleaf, and mustard. Thirty-three days after treatment, a complete kill or nonemergence of all plants was recorded except for safflower which showed no injury.

Since a relatively small amount of one or more of the active uramidobenzoates should be uniformly distributed over the area to be treated, the compounds preferably are formulated with conventional herbicide carriers, either liquid or solid. Thus, the compounds can be impregnated on or admixed with a pulverulent solid carrier such as lime, talc, clay, bentonite, calcium chloride, vermiculite, calcium carbonate, and the like. Alternatively, the compounds can be dissolved or suspended in a liquid carrier such as water, kerosene, alcohols, diesel oil, xylene, benzene, glycols, and the like. A surfactant preferably is included to aid in dispersion, emulsification and coverage. The surfactant can be ionic or nonionic, and may be liquid or a solid. The use of the term "surfactant" herein is intended to include such compounds commonly referred to as wetting agents, dispersing agents and emulsifying agents. Typical surfactants include the alkyl-arylsulfonates, the fatty alcohol sulfates, sodium salt of naphthalenesulfonic acid, alkylaryl polyether alcohols, long chain quaternary ammonium compounds, sodium salts of petroleum-derived alkylsulfonic acids, polyoxyethylene-sorbitan monolaurate, and the like. These dispersing and wetting agents are sold under numerous trademarks and may either be pure compounds, mixtures of compounds of the same general group, or they may be mixtures of compounds of different classes. Surfactants can also be included in compositions containing a solid inert carrier.

Concentrated compositions containing the active agent which can be subsequently diluted, as with water, to the desired concentration for application to plants and soil are also provided. The advantages of such concentrates are that they are prepared by the manufacturer in a form such that the user need only mix them with a locally available carrier, preferably water, thereby keeping shipping costs to a minimum while providing a product which can be used with a minimum of equipment and effort. Such concentrates may contain from about 5 to about 80 percent by weight of one or more of the active uramidobenzoates with a carrier or diluent, which may be a solid or liquid. Liquid carriers which are miscible with the active agent or other liquids in which the compounds may be suspended or dispersed may be used. A surfactant is also generally included to facilitate such dilution or dispersion in water. However, the surfactant itself may comprise the carrier in such concentrates.

The herbicidal compositions can include other beneficial adjuvants, such as humectants, oils and contact agents. Also, other herbicides, such as the sodium borates, sodium chlorates, chlorophenoxyacetic acids, triazines, substituted ureas, uracils, carbamates, halobenzoic acids, haloalkanoic acids, anilides, pyridinols, and picolinic acids, can be included in the formulation.

What is claimed is:

1. A herbicidal composition consisting essentially of about 5 to about 80 percent, by weight, of a phytotoxic lower aliphatic hydrocarbon ester of 2-(ω-alkyleneiminouramido)benzoate and an inert liquid or pulverulent solid carrier therefor, where the alkylene group has from about 5 to about 7 carbon atoms.

2. A herbicidal composition consisting essentially of about 5 to about 80 percent, by weight, of a compound of the formula

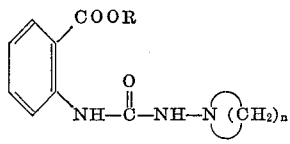

wherein R is selected from the group consisting of lower alkyl, lower alkenyl, lower alkynyl, phenyl, lower alkylphenyl, and the halo derivatives thereof, and $n$ is an integer of from about 4 to about 7, and an inert liquid or pulverulent solid carrier therefor.

3. A composition according to claim 2 in which a surfactant is present.

4. A composition according to claim 2 in which said compound is n-propyl 2-(ω-hexamethyleneiminouramido)benzoate.

5. A composition according to claim 2 in which said compound is methyl 2-(ω-hexamethyleneiminouramido)benzoate.

6. A composition according to claim 2 in which said compound is ethyl 2-(ω-hexamethyleneiminouramido)benzoate.

7. A composition according to claim 2 in which said compound is methyl 2-(ω-pentamethyleneiminouramido)benzoate.

8. A composition according to claim 2 in which said compound is phenyl 2-(ω-hexamethyleneiminouramido)benzoate.

9. The method for controlling weeds which comprises applying to the locus of said weeds a phytotoxic amount of a compound of the formula

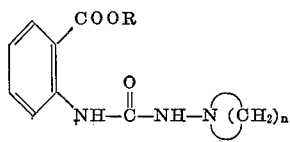

wherein R is selected from the group consisting of lower alkyl, lower alkenyl, lower alkynyl, phenyl, lower alkylphenyl, and the halo derivatives thereof, and $n$ is an integer of from about 4 to about 7.

10. The method according to claim 9 wherein R is lower alkyl.

11. The method according to claim 9 in which from about 1 to about 15 pounds of said compound are applied per acre.

12. The method according to claim 9 in which said compound is methyl 2-(ω-pentamethyleneiminouramido)benzoate.

13. The method according to claim 9 in which said compound is ethyl 2-(ω-hexamethyleneiminouramido)benzoate.

14. The method according to claim 9 in which said compound is n-propyl 2-(ω-hexamethyleneiminouramido)benzoate.

15. The method according to claim 9 in which said compound is phenyl 2-(ω-pentamethyleneiminouramido)benzoate.

16. The method according to claim 9 in which said weeds are in the presence of peanuts.

17. The method for controlling weeds which comprises applying to the locus of said weeds a phytotoxic amount of a lower aliphatic hydrocarbon ester of 2-(ω-alkyleneiminouramido)benzoic acid in which said alkylene group has from about 4 to about 7 carbon atoms.

18. The method according to claim 17 in which said weeds are in the presence of peanuts.

References Cited

UNITED STATES PATENTS

| | | | |
|---|---|---|---|
| 2,073,099 | 3/1937 | Eisleb | 260—471 |
| 2,843,621 | 7/1958 | Oroshnik et al. | 260—471 |
| 2,921,077 | 1/1960 | Hiltmann et al. | 260—471 |
| 3,001,861 | 9/1961 | Fischer et al. | 71—120 |
| 3,260,590 | 7/1966 | Fischer et al. | 71—111 |
| 3,305,347 | 2/1967 | Minieri | 71—121 |
| 3,318,680 | 5/1967 | Levitt | 71—120 |
| 3,330,641 | 7/1967 | Woods et al. | 71—94 |
| 3,244,503 | 4/1966 | Watts | 71—92 |
| 3,397,050 | 8/1968 | Loux | 71—92 |

FOREIGN PATENTS

| | | |
|---|---|---|
| 700,258 | 12/1964 | Canada. |
| 1,318,998 | 1/1963 | France. |
| 1,325,926 | 3/1963 | France. |
| 6407857 | 1/1965 | Netherlands. |
| 6407915 | 1/1965 | Netherlands. |
| 1,197,845 | 6/1959 | France. |

OTHER REFERENCES

Imperial Chem. Ind. Ltd., "Prep. of N-(2-Carboxyphenyl)N′-Arylureas" (1965), C.A. 63, pp. 537–38 (1965).

Imperial Chem. Ind. Ltd., "Therapeutic Urea Derivatives" (1965), C.A. 63, p. 1742 (1965).

Bruce et al., "Cytokinin Activity of Some Substituted Ureas and Thioureas (1966), Proc. Roy. Soc. (London), Ser. B, vol. 165, August 1966, pp. 245, 256, 261, 264 and 265.

LEWIS GOTTS, Primary Examiner

G. HOLLRAH, Assistant Examiner

U.S. Cl. X.R.

71—82, 92, 93, 94, 95; 260—239, 294.3, 326.3